(12) United States Patent
Hilgers et al.

(10) Patent No.: US 8,451,089 B2
(45) Date of Patent: May 28, 2013

(54) RADIO IDENTIFICATION WITH AN ADDITIONAL CLOSE-RANGE CHECK

(75) Inventors: Achim Hilgers, Alsdorf (DE); Heiko Pelzer, Erkelenz (DE)

(73) Assignee: NXP B.V., Eindhoven (NL)

( * ) Notice: Subject to any disclaimer, the term of this patent is extended or adjusted under 35 U.S.C. 154(b) by 742 days.

(21) Appl. No.: 11/629,717

(22) PCT Filed: Jun. 10, 2005

(86) PCT No.: PCT/IB2005/051922
§ 371 (c)(1),
(2), (4) Date: Aug. 16, 2007

(87) PCT Pub. No.: WO2005/124669
PCT Pub. Date: Dec. 29, 2005

(65) Prior Publication Data
US 2008/0157929 A1    Jul. 3, 2008

(30) Foreign Application Priority Data
Jun. 15, 2004 (EP) .................................... 04102722

(51) Int. Cl.
*H04Q 5/22* (2006.01)
*H04K 1/00* (2006.01)
(52) U.S. Cl.
USPC ........................................ 340/10.1; 340/5.53
(58) Field of Classification Search
USPC ............................................ 340/10.1, 572.4
See application file for complete search history.

(56) References Cited

U.S. PATENT DOCUMENTS

| | | | | |
|---|---|---|---|---|
| 5,134,277 A * | 7/1992 | Yerbury et al. | ......... | 250/214 RC |
| 5,793,289 A * | 8/1998 | Strzelec | ..................... | 340/572.2 |
| 5,874,724 A * | 2/1999 | Cato | ............................. | 235/492 |
| 5,983,347 A | 11/1999 | Brinkmeyer et al. | | |
| 6,097,301 A * | 8/2000 | Tuttle | ......................... | 340/693.9 |
| 6,346,878 B1 * | 2/2002 | Pohlman et al. | ............. | 340/435 |
| 6,658,328 B1 | 12/2003 | Alrabady et al. | | |
| 6,714,133 B2 * | 3/2004 | Hum et al. | ................. | 340/573.4 |
| 6,867,686 B1 * | 3/2005 | Emmerling et al. | ........ | 340/10.2 |
| 6,954,007 B1 * | 10/2005 | Meier et al. | ................. | 307/10.2 |
| 7,030,761 B2 * | 4/2006 | Bridgelall et al. | ......... | 340/572.2 |

(Continued)

FOREIGN PATENT DOCUMENTS

| | | |
|---|---|---|
| EP | 0056726 A | 7/1982 |
| WO | 2004114227 A | 12/2004 |

*Primary Examiner* — Brian Zimmerman
*Assistant Examiner* — Cal Eustaquio

(57) ABSTRACT

The invention relates to a method and a system for radio identification with an additional close-range check, which prevent misuse of a radio identification system and increase the security of radio identification. In particular, so-called relay attacks are to be largely prevented in passive entry systems. The method according to the invention firstly provides for activation of a transponder (S1) for reading of its data. After this step, an additional close-range status signal is provided (S2) which indicates the close range of a reader. Once the close-range status signal has been detected by a transponder (S3), data transmission for reading of the data stored in the transponder by the reader is possibly enabled in reaction to the detection of the close-range status signal (S4) and the data can be read by the reader for identification of the transponder (S5). The system according to the invention for radio identification with an additional close-range check consists of a reader for reading the data stored in a transponder and of an evaluation unit which is connected to the reader for identifying the transponder on the basis of the read data.

21 Claims, 2 Drawing Sheets

U.S. PATENT DOCUMENTS

| | | | |
|---|---|---|---|
| 2001/0033231 A1* | 10/2001 | Matsui et al. | 340/672 |
| 2002/0057191 A1* | 5/2002 | Bates et al. | 340/10.1 |
| 2002/0067248 A1* | 6/2002 | Howells | 340/426 |
| 2002/0116509 A1* | 8/2002 | DeLaHuerga | 709/229 |
| 2002/0140542 A1* | 10/2002 | Prokoski et al. | 340/5.52 |
| 2002/0171546 A1* | 11/2002 | Evans et al. | 340/540 |
| 2003/0001722 A1* | 1/2003 | Smith | 340/5.61 |
| 2004/0198309 A1* | 10/2004 | Duvall | 455/404.1 |
| 2005/0134427 A1* | 6/2005 | Hekimian | 340/5.53 |
| 2005/0257411 A1* | 11/2005 | Wootton et al. | 42/70.01 |

* cited by examiner

RADIO IDENTIFICATION WITH AN ADDITIONAL CLOSE-RANGE CHECK

FIELD OF THE INVENTION

The invention relates to a method for radio identification with an additional close-range check.

The invention furthermore relates to a system for radio identification with an additional close-range check.

The invention furthermore relates to a transponder for radio identification with an additional close-range check.

The invention furthermore relates to a reader for radio identification with an additional close-range check.

BACKGROUND OF THE INVENTION

So-called radio identification systems (also known as transponder or RFID systems) are widely used these days. Such wireless identification systems are used for example to set up access controls for vehicles, buildings or areas and to check access authorizations. Particularly in the motor vehicle sector, such systems are usually used for access control and/or as immobilizers. In such systems, in order to check the authorization, the data memory of a transponder is read by a reader and compared with reference data in an evaluation unit in order to identify the transponder. Transmission of the (digital) data takes place in a wireless manner via high-frequency signals.

Like all identification systems which operate on the basis of digital data, radio identification systems are also at risk of so-called brute force attacks and/or dictionary attacks. One possibility for fending off these attacks or making them more difficult is disclosed in the document U.S. Pat. No. 6,658,328 B1. Said document provides for special encryption at least of some of the data in order to prevent dictionary attacks.

However, one fundamental risk in terms of security against misuse of radio identification systems consists in the lack of a physical presence check of the authorized key. A certain degree of security is provided by a transmission or reception range of the reader and/or of the transponder which is as short as possible. However, although the ranges in particular of passive transponders (so-called tags) are relatively short, this security of the system as a whole can be overcome very simply by so-called relay attacks.

In this case, a relay station is connected between the evaluation unit (vehicle) and the transponder (user), which relay station forwards the high-frequency signals (data) of the vehicle and of the transponder even over relatively large distances. Therefore, even a transponder of the vehicle proprietor who is far away from his vehicle can be read unnoticed. To this end, a first transceiver is placed in the direct vicinity of the vehicle and a second transceiver is placed in the direct vicinity of the owner or of the transponder, and thus an activation signal of the reader and also the response signals (data) of the transponder are transmitted over any distance (i.e. depending on the transmission power of the two transceivers). The vehicle proprietor will usually not be aware of such a relay attack.

This risk of misuse is moreover particularly high in those radio identification systems in which no additional manual activation of the transponder is required for radio identification. However, these radio identification systems, which are known as passive entry systems, are increasingly being used since they provide increased convenience for the user.

By way of example, in such passive entry systems for motor vehicles, the transponder in the user's key is activated in a wireless manner as the user approaches the vehicle, by triggering a high-frequency signal of the reader (which in turn is triggered for example by operating the door handle). Said transponder then transmits the data stored therein (including the so-called key) to the interrogating unit (the reader in the car). The evaluation unit in the vehicle then checks the key with its own data and opens the doors of the vehicle in the event of successful identification. If the key is not transmitted or an incorrect key is transmitted, access is denied.

OBJECT AND SUMMARY OF THE INVENTION

It is therefore an object of the invention to provide a method of the type specified in the first paragraph and a system of the type specified in the second paragraph and a transponder of the type specified in the third paragraph and a reader of the type specified in the fourth paragraph, in which the above-mentioned disadvantages are avoided.

In order to achieve the aforementioned object, such a method is provided with features according to the invention, so that a method according to the invention can be characterized as follows:

A method for radio identification with an additional close-range check, in which the following steps are carried out:
    activation of a transponder for the contactless reading of data stored in the transponder;
    reading of the data by a reader for identification of the transponder, wherein the following further steps are provided:
    provision of a close-range status signal which indicates the close range of the reader;
    detection of the close-range status signal by the transponder;
    enabling of data transmission by the transponder for reading of the data stored in the transponder by the reader in reaction to the detection of the close-range status signal.

In order to achieve the aforementioned object, such a system is provided with features according to the invention, so that a system according to the invention can be characterized as follows:

A system for radio identification with an additional close-range check, consisting of:
    a reader for the contactless reading of data stored in a transponder;
    an evaluation unit which is connected to the reader for identifying the transponder on the basis of the read data;
    a device for providing a close-range status signal which indicates the close range of the reader;
    at least one transponder, wherein the transponder is usually blocked against data transmission for reading of its data by the reader and wherein the transponder has a control circuit which enables data transmission in reaction to detection of the close-range status signal.

In order to achieve the aforementioned object, such a transponder is provided with features according to the invention, so that a transponder according to the invention can be characterized as follows:

A transponder for a radio identification system with an additional close-range check, comprising
    an antenna for transmitting and receiving radio signals of the reader;
    an integrated circuit for controlling the data transmission, wherein the integrated circuit is usually blocked against data transmission; and
    a control circuit which is connected to the integrated circuit in order to enable the integrated circuit for data transmission for reading of the data by the reader in reaction to detection of a close-range status signal.

In order to achieve the aforementioned object, such a reader is provided with features according to the invention, so that a reader according to the invention can be characterized as follows:

A reader for a radio identification system with an additional close-range check, which comprises:
- a device for transmitting and receiving radio signals in order to read the data of a transponder;
- an evaluation unit for identifying the transponder on the basis of the read data; and
- a device for providing a close-range status signal in order to ensure reading of the data stored in the transponder only in close range of the reader.

One advantageous measure for increasing the security is that, in order to carry out the close-range check, a time window is predefined for detecting the close-range status signal following activation of the transponder.

A further advantageous measure for increasing the security is that a coded close-range status signal is provided.

Another advantageous measure for increasing the security is that a change in the coding of the close-range status signal is provided after each successful identification.

An additional advantageous measure for increasing the security is that the number of failed attempts is restricted to a predefined number.

A further advantageous measure for increasing the security is that a variable close-range status signal is provided (e.g. a magnetic field with changing polarization).

Another advantageous measure which provides for better spatial use of the system is achieved by integrating the device for providing a close-range status signal and/or the evaluation unit in the reader.

The abovementioned aspects and further aspects of the invention emerge from the example of embodiment described below and are explained on the basis of this example of embodiment.

BRIEF DESCRIPTION OF THE DRAWINGS

The invention will be further described with reference to an example of embodiment shown in the drawings to which, however, the invention is not restricted.

DESCRIPTION OF EMBODIMENTS

Figure 1:
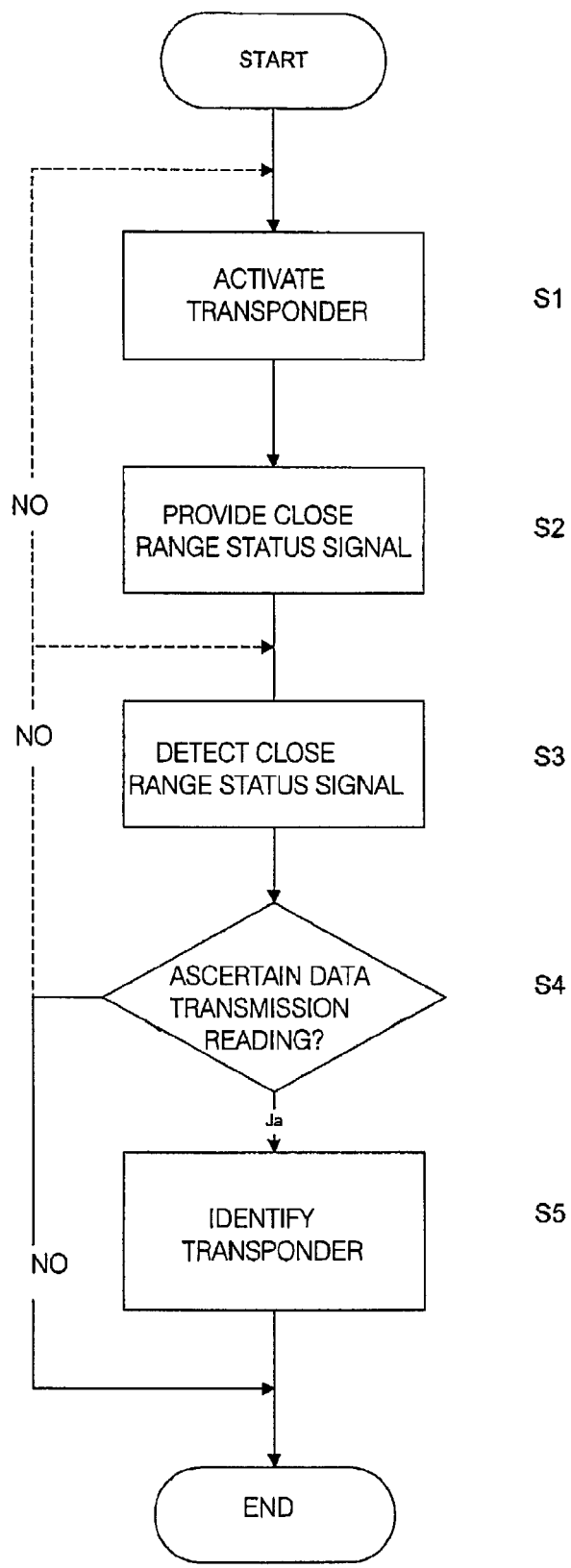
FIG. 1 shows an example of embodiment of the method according to the invention for radio identification, in the form of a flow diagram.

Firstly, one possible example of embodiment of the method according to the invention will be described with reference to FIG. 1. As shown in FIG. 1, the radio identification method according to the invention proceeds as follows:

Step S1: Following activation of the reader, the latter transmits a high-frequency signal for activating the transponder (activation signal). When the transponder receives this activation signal, it becomes activated for radio identification in step S1.

Step S2: The transponder is then in principle activated for radio transmission; however, its data for the identification cannot yet be transmitted since no additional close-range check has yet taken place. To this end, in step S2, a close-range status signal is provided in the close range of the reader, which close-range status signal indicates the close range of the reader.

Step S3: The close-range status signal is detected by the transponder.

Step S4: In step 4, a check is made to ascertain whether the data transmission for reading of the data by the reader is to be enabled. In the example of embodiment described here, an enable signal for a control circuit is generated on account of the detection of the close-range status signal. The control circuit then enables the data transmission of the transponder and thus allows reading of the data by the reader by means of wireless transmission of high-frequency signals, in which it is ensured that the transponder is also located in close range of the reader. If there is no detection in S3, the transponder does not enable the data transmission and the method is ended.

Alternatively, the method could also branch in a loop here to step S1 or S3, as indicated by the dashed lines. The number of loop run-throughs before a positive response is achieved in S4 may additionally be limited to a predefined number. By detecting and checking a number of times, increased reliability of the method can be achieved.

The detection is intended to ensure that the transponder is located in close range of the reader. To this end, the sensitivity for the detection of the close-range status signal may for example be set such that close-range status signals can be detected only when they have a signal strength which is at least as great as the signal strength of the close-range status signal at the outer limit of the close range. Detection of the close range then directly triggers the enabling of the data transmission.

As an alternative or in addition, the detected signal may also be compared with a predefined threshold value. If the threshold value is exceeded, an electrical signal is generated which is evaluated to check successful detection. A static magnetic field could therefore be used for example as the close-range status signal. In principle, however, besides electromagnetic signals, optical and/or acoustic signals (e.g. ultrasound) could alternatively also be used for the close-range status signal.

Step S5: The read data of the transponder contain inter alia key data (e.g. a security key). These read key data are used in an evaluation unit to identify the transponder.

Depending on the result of the evaluation unit, i.e. of the identification, access to the motor vehicle is then allowed for example or starting of the engine is enabled.

Steps S1 and S2 are shown after one another in FIG. 1. However, this does not mean that there is a fixed order of S1 and S2. It would also be conceivable to activate the transponder after the close-range status signal has been provided or even to provide a close-range status signal at the same time as the activation takes place.

The basis used for the method described in FIG. 1 is a reader which is continuously active and/or transmits activation signals in a cyclical manner. However, a reader which is not continuously active and which can be placed in a stand-by mode in order to save power is also conceivable. In this case, a wake-up signal can be generated and the reader can be activated for radio identification for example by operating the door handle.

In the example of embodiment described here of the method according to the invention, the additional close-range check takes place with the aid of a static magnetic field which both serves as a signal for indicating a close range of the reader and serves as an enable signal for an activated transponder with blocked data transmission. Only this additional check enables the data transmission of the transponder and thus allows reading of the data stored in the transponder and identification thereof in an evaluation unit. Activation of the reading of the data for radio identification is thus possible only in close range of the reader, so that relay attacks are at least substantially made more difficult.

Since this additional close-range check of the transponder takes place automatically and in a wireless manner, high convenience is provided while at the same time providing high security against misuse.

In order to increase the security and make relay attacks even more difficult, a dynamic magnetic field may also be provided instead of a static magnetic field. As a result, a coded close-range status signal can additionally be generated, and this would make relay attacks even more difficult.

Improved security of the radio identification method according to the invention could additionally be achieved by changing the coding, which is carried out after each successful identification of the transponder.

A further increase in the security would be achieved by changing the polarization of the magnetic field (e.g. horizontal/vertical, rotating to the right/left). Additional coding of the signal is likewise conceivable.

The radio identification method can be carried out both for passive and active transponders.

A system for carrying out the radio identification method according to the invention will be described next.

The system for radio identification with an additional close-range check consists in one embodiment of a reader for reading the data stored in a transponder. The reader is connected to an evaluation unit which can carry out an identification on the basis of the data read by the reader. Furthermore, the system comprises a device for providing a close-range status signal and at least one transponder. The transponder is usually blocked against data transmission for reading by the reader. It furthermore comprises a control circuit which enables data transmission in reaction to a checking of the close-range status signal.

The device for providing a close-range status signal may be a magnetic transmitter which generates a static magnetic field. The transmitter may however also provide a dynamic magnetic field as the close-range status signal, wherein this dynamic magnetic field may furthermore additionally have a coding.

The transmitter for the close-range status signal may either be integrated in the reader or be arranged separately in the vicinity of the reader or in the vicinity of an activation device of the reader (e.g. door handles) and be connected to the reader. The evaluation unit may likewise be integrated in the reader or be arranged separately and connected to the reader. If the transmitter and/or evaluation unit is/are integrated in the reader, the system according to the invention can be designed in a space-saving manner. The wiring of the system is also simplified.

Figure 2:
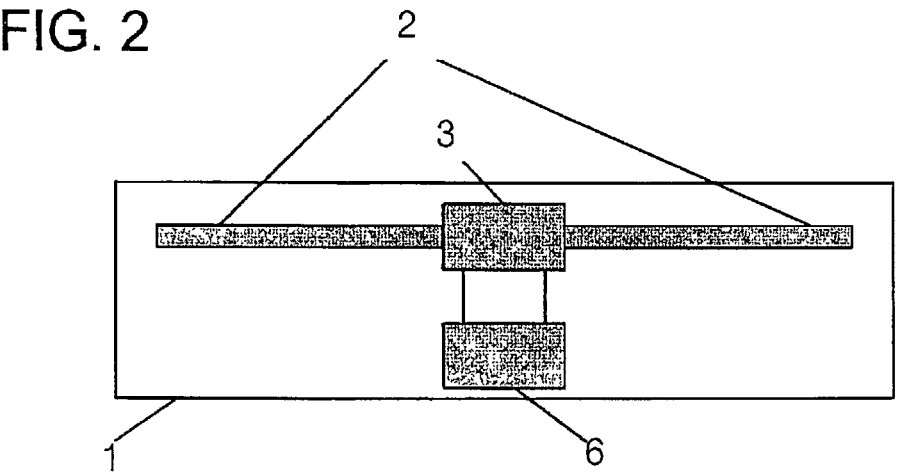
FIG. 2 shows the basic design of a transponder according to the invention, in the form of a block circuit diagram.

FIG. 2 shows a transponder 1 for a radio identification system with additional activation of the reading of transponders in close range of a reader. As can be seen from FIG. 2, the transponder 1 has an antenna 2 for receiving and transmitting radio signals of the reader, and an integrated circuit 3 in which data for a radio identification are stored and which is usually blocked against data transmission for reading of the data by the reader.

Figure 3:
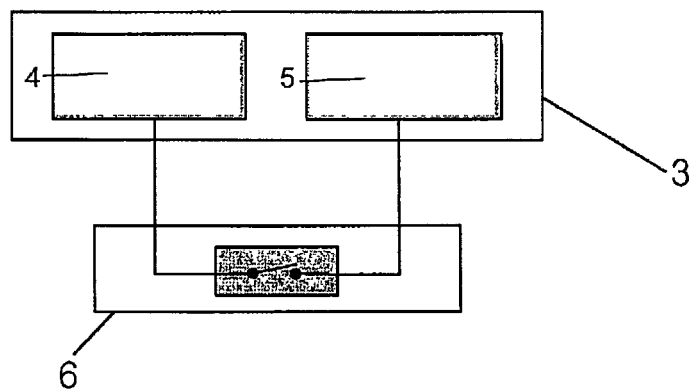
FIG. 3 shows part of FIG. 2 as a block circuit diagram.

As shown in FIG. 3, the blocking may take place for example in that the connecting line between a data memory 5 (e.g. EEPROM) and a microcontroller 4 (e.g. IC or chip) has a control circuit 6 connected therebetween which usually keeps the connection interrupted.

Figure 4:
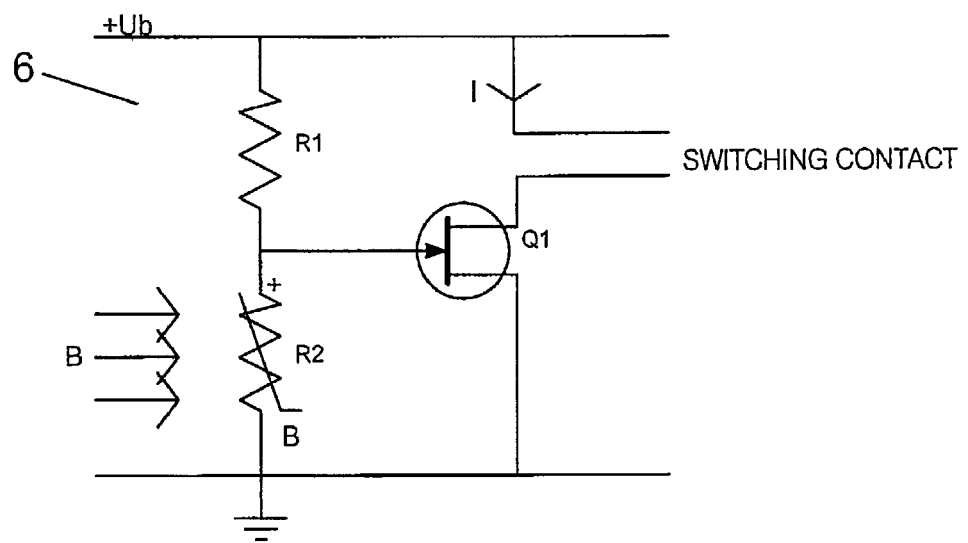
FIG. 4 shows the detailed design of a circuit device, in the form of a schematic circuit diagram.

The control circuit 6 shown in principle in FIG. 3 is shown in more detail in FIG. 4. The control circuit 6 may in principle be designed like a switch which reacts very sensitively to magnetic fields. When the magnetic fields are generated in a spatially limited area or with decreasing field strength at a relatively large distance from the vehicle, activation of the switch and thus reading of the data from the transponder become possible only in close range of the magnetic source. The control circuit 6 shown by way of example in FIG. 4 may be formed by means of magnetic components such as, for example, Hall generators, magnetic resistors and/or magnetic diodes. These components change their electrical property (voltage, resistance, etc.) when a magnetic field changes. If necessary, the aforementioned components have to be expanded by a suitable electronic circuit in order to convert the detected close-range status signal of the magnetic-field-dependent component into a corresponding electrical signal.

FIG. 4 shows by way of example a control circuit which is combined on a magnetic resistor R2 with an electrical converter circuit. As the magnetic field B increases, the resistance of the resistor becomes greater, and this brings about switching of the transistor Q1. This allows a current flow I over the switching contact, and this corresponds to closing of a switch. When the magnetic field is reduced or switched off, the transistor blocks and prevents the current flow, and this in turn corresponds to opening of a switch.

In order to make the method and the system even more secure against misuse by relay attacks, it may be modified such that use is made not just of a simple magnetic field for access authorization but rather of a coded magnetic field. This means that a dynamic access code of desired length is transmitted by means of the magnetic field. This unique code, which may be formed in accordance with known standard methods, is known only to the vehicle and to the original key. The transponder checks only the magnetically transmitted access code with its own code (stored in the EEPROM) and, if the comparison is successful, can access the data of the transponder (e.g. a security code, a serial number and the like).

Furthermore, the risk of detection and reproduction of this coding can be further reduced if this coding is stored in a changed form both in the vehicle electronics and in the transponder after each authorized access or after each successful identification.

In order to additionally increase the security, the number of failed attempts for successful detection of the magnetic code may furthermore be provided. Likewise, a device for providing a time window within which the magnetic code has to be received may likewise be provided in the transponder.

A further increase in the security can be achieved by changing the polarization of the magnetic field (e.g. horizontal/vertical, rotating to the right/left).

Besides use for access control purposes, the radio identification system according to the invention can also be used as an immobilizer. Once the vehicle has been accessed and the engine has been successfully started, by means of pulsed operation the physical presence of the transponder in the vicinity of the reader or of the close-range status signal transmitter arranged in the vicinity of the reader can be carried out. If no data communication with the transponder can be carried out within a defined time window (i.e. the vehicle has moved away from the relay station), driving is prevented (e.g. by interrupting the fuel line and/or by switching off). In addition to or instead of activating an immobilizer, an appropriate emergency signal (GSM) including the current position of the vehicle (GPS) may be transmitted to the police.

Although the embodiments have been described with regard to a magnetic close-range check, activation by means of ultrasound is also conceivable. An optical activation for example by means of laser signals could also take place.

It should be pointed out that the provision of reference numbers in no way limits the scope of protection.

The invention claimed is:

1. A method for radio identification with an additional close-range check comprising:
    activating a transponder for contactless reading of data stored in the transponder;
    reading of the stored data by a reader for identification of the activated transponder;
    providing a close-range status signal which indicates a close range of the reader, wherein a close-range detection status is coded;
    changing coding for the provided close-range status signal in response to each successful identification of the activated transponder;
    detecting the provided close-range status signal by the activated transponder;
    indicating the activated transponder is located in the close range of the reader;
    enabling data transmission by the activated transponder; and
    reading the data stored in the activated transponder by the reader in reaction to the detecting step.

2. The method as claimed in claim 1, further comprising:
    detecting the provided close-range status signal within a predefined time window following the enabling step.

3. A system for radio identification with an additional close-range check, comprising:
    a close-range reader configured to contactlessly read data stored in a transponder;
    an evaluation unit, which is connected to the reader, configured to identify the transponder on the basis of the read data;
    a device configured to provide a close-range status signal which indicates a close range of the reader, wherein the close-range status signal is coded, and the coding for the close-range status signal changes in response to each successful identification of the transponder;
    at least one transponder, wherein a control circuit enables data transmission in reaction to detection of the close-range status signal which indicates the transponder is located in the close-range of the reader.

4. The system as claimed in claim 3, wherein the device configured to provide the close-range status signal activates the reading of the data stored in the transponder by the reader.

5. The system as claimed in claim 3, wherein the device configured to provide a close-range status signal is integrated in the reader.

6. The system as claimed in claim 3, wherein the evaluation unit is integrated in the reader.

7. A close-range transponder for a radio identification system with an additional close-range check, comprising
    an antenna configured to transmit and receive radio signals of a reader;
    an integrated circuit configured to control a data transmission; and
    a control circuit configured to enable the integrated circuit for the data transmission for reading of the data by the reader in reaction to detection of a close-range status signal which indicates the transponder is located in a close-range of the reader, wherein the close-range status signal is coded and the coding for the close-range status signal changes in response to each successful identification of the transponder.

8. A close-range reader for a radio identification system with an additional close-range check which comprises:
    a device configured to transmit and receive radio signals in order to read data of a transponder;
    an evaluation unit configured to identify the transponder on the basis of the read data; and
    a device configured to provide a close-range status signal which indicates the transponder is located in a close-range of the reader in order to ensure reading of the data stored in the transponder only in the close-range of the reader wherein the close-range status signal is coded and wherein the coding for the close-range status signal changes in response to each successful identification of the transponder and is selected from a group consisting of a magnetic signal and an acoustic signal.

9. The system of claim 3, wherein there are up to a predefined number of attempts to identify the transponder.

10. The system of claim 3, wherein detecting the close-range status signal corresponds to detecting a signal strength at least as great as a signal strength of the close-range status signal at an outer limit of the close range.

11. The system of claim 3, wherein detecting the close-range status signal corresponds to detecting a signal strength that exceeds a predefined threshold.

12. The system of claim 3, wherein successful identification of the transponder permits access to a motor vehicle.

13. The system of claim 3, wherein operating a door handle activates the close-range reader.

14. The system of claim 3, wherein polarization of a magnetic field for the close-range status signal changes after each successful identification of the transponder.

15. The system of claim 14, wherein horizontal polarization of the magnetic field changes.

16. The system of claim 14, wherein vertical polarization of the magnetic field changes.

17. The system of claim 14, wherein chirality of the polarization of the magnetic field changes.

18. The system of claim 3, wherein successful identification of the transponder immobilizes a motor vehicle.

19. The system of claim 3, wherein successful identification of the transponder transmits an emergency signal to proper authorities.

20. The system of claim 3, wherein the close-range status signal is an ultrasound signal.

21. The system of claim 3, wherein the close-range status signal is an optical signal.

* * * * *